Oct. 4, 1927.
J. R. BARTHOLOMEW
VEHICLE VACUUM BRAKE
Filed Feb. 8, 1926
1,644,558
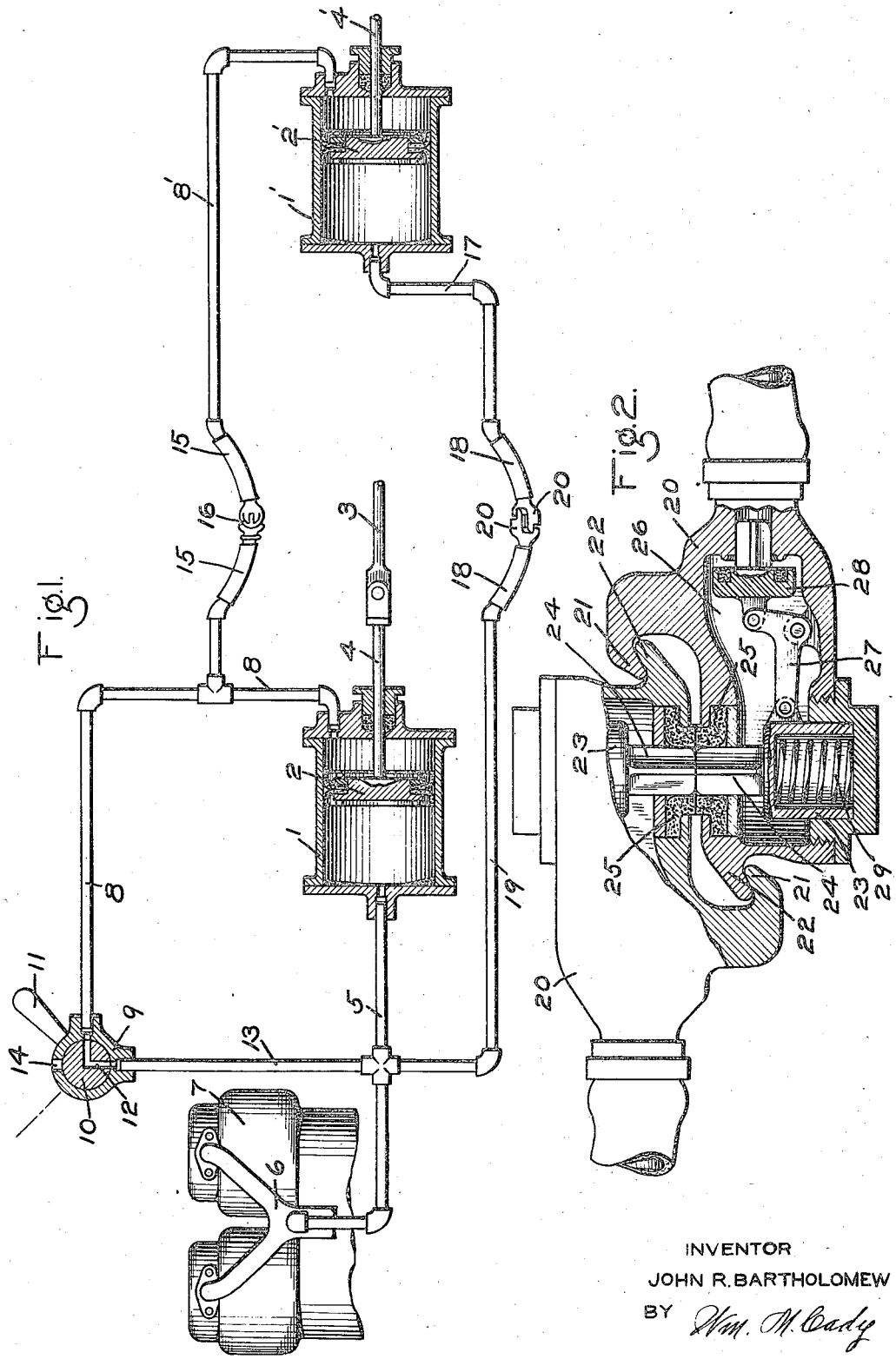
INVENTOR
JOHN R. BARTHOLOMEW
BY Wm. M. Cady
ATTORNEY Patented Oct. 4, 1927.

1,644,558

UNITED STATES PATENT OFFICE.

JOHN R. BARTHOLOMEW, OF MONTCLAIR, NEW JERSEY, ASSIGNOR TO THE WESTINGHOUSE AIR BRAKE COMPANY, OF WILMERDING, PENNSYLVANIA, A CORPORATION OF PENNSYLVANIA.

VEHICLE VACUUM BRAKE.

Application filed February 8, 1926. Serial No. 86,763.

This invention relates to automotive brakes, and more particularly to a brake of the type in which the opposite sides of the brake piston are normally subject to a vacuum and the brakes are applied by letting air from the atmosphere into the brake cylinder at one side of the brake piston.

The principal object of my invention is to provide means for operating the brakes on one or more trailers with the brakes on a truck equipped with a brake of the above character.

In the accompanying drawing; Fig. 1 is a diagrammatic view of a truck and trailer automotive brake equipment embodying my invention; and Fig. 2 a sectional view of the valved hose coupling employed in connection with my invention.

The truck brake equipment shown in Fig. 1 comprises a brake cylinder 1 containing a brake cylinder piston 2 which is connected to a pull rod 3 by piston stem 4, the pull rod 3 being connected to the usual brake mechanism so as to apply the brakes when the piston stem 4 is pulled toward the left by the piston 2.

A pipe 5 opens into brake cylinder 1 at one side of piston 2 and is connected to a vacuum source, preferably the suction intake pipe 6 of an internal combustion engine 7. The opposite side of the brake cylinder 1 is connected to a pipe 8 which leads to a hand operated control valve device 9. The valve device 9 contains a valve 10 adapted to be operated by a handle 11 and having a port 12 which in one position connects pipe 8 with pipe 13, leading to pipe 5 and in another position connects pipe 8 to an atmospheric port 14.

On the trailer, a brake cylinder 1' similar to the brake cylinder on the truck is provided, and one side of the piston 2' is connected to pipe 8' which is connected through a flexible hose 15, having a hand operated coupling 16, with pipe 8 on the truck.

The brake cylinder 1', at the opposite side of the piston 2', is connected to a pipe 17. The pipe 17 is connected through a flexible hose 18 with a pipe 19 which is connected to pipe 5. For connecting the flexible hose sections between the truck and the trailer, a coupling is provided, as shown in Fig. 2, comprising coupling heads 20, having locking ribs 21 and 22 adapted to engage when the two coupling heads are rotated, so as to lock the heads in engagement.

Each coupling head contains a movable member 23, having a stem 24 which is adapted to project through the opening of the gasket 25. In a chamber 26, a bell crank 27 is pivotally mounted and one arm of the bell crank is connected to the member 23. The other arm is connected to a valve 28, which controls communication through the hose section 18. When the coupling heads are connected together, the engagement of the stems 24 causes the outward movement of the members 23, so that the bell cranks 27 are operated to unseat the valves 28. When the coupling heads are separated, the springs 29 shift the members so that the bell cranks 27 operate to seat the valves 28.

In operation, when the engine 7 is running, a vacuum is created in the intake pipe 6 and a similar vacuum is created on opposite sides of the piston 2, when the valve 10 is in the position shown in the drawing. The piston 2' on the trailer is also subjected to a vacuum on its opposite sides, since the pipes 8' and 17 are connected to corresponding sides of the brake cylinder piston 2 on the truck.

If it is desired to apply the brakes, the handle 11 is turned so as to move the valve 10 to the position in which pipe 8 is connected to the atmospheric port 14. Air at atmospheric pressure is then admitted to the right hand side of the brake cylinder piston 2, as well as to the right hand side of the brake cylinder piston 2' on the trailer, and since the vacuum on the opposite side of the brake cylinder pistons is maintained by being connected to the intake pipe of the engine, the pistons will be operated by atmospheric pressure to apply the brakes.

If the trailer should separate from the truck, the valves 28 will be automatically closed, so as to hold the vacuum on the left side of the brake cylinder piston 2' on the trailer, while air from the atmosphere will enter the pipe 8', due to the separation of the coupling 16, so that the brake will be applied on the trailer.

On the truck, the valve 28 of the truck coupling head will also close, so that the vacuum is maintained on the left hand side of the brake cylinder piston 2 and the brakes may then be applied on the truck, if the handle 11 is turned to the position in which pipe 8 is cut off from communication with pipe 13.

It will be evident that the brakes on any number of trailers may be operated the same as in the case of the single trailer above described.

The construction described may also be employed to operate the brakes on the front wheels as well as the rear wheels of a motor vehicle.

Having now described my invention, what I claim as new and desire to secure by Letters Patent, is:—

1. The combination with a brake cylinder containing a brake cylinder piston, of piping connected to the brake cylinder chambers at opposite sides of said piston, means for maintaining a vacuum through said piping at opposite sides of said piston, and means associated with said piping and operated upon separation of the piping for holding the vacuum at one side and admitting air from the atmosphere to the other side of said piston.

2. The combination with a brake cylinder containing a brake cylinder piston, of piping connected to the brake cylinder chambers at opposite sides of said piston, means for maintaining a vacuum through said piping at opposite sides of said piston, separable couplings in said piping, and means associated with the separable coupling in the piping leading to one side of said piston for preventing the loss of the vacuum from said side upon separation of the couplings.

3. The combination with a brake cylinder containing a brake cylinder piston, of a pipe connected to the brake cylinder chamber at opposite sides of said piston, a separable coupling in each pipe, and a valve in one of said couplings for closing communication through the corresponding pipe upon separation of the couplings.

4. In a vacuum brake, the combination with a vacuum creating source and a brake cylinder containing a brake cylinder piston, of a manually operable valve having a position for connecting the brake cylinder chambers at the opposite sides of said piston to said source, an additional brake cylinder containing a brake cylinder piston, pipes connecting corresponding chambers of said brake cylinders, separable couplings in each pipe, and valves in the coupling in one pipe operated upon separation of the couplings for preventing loss of vacuum through said pipe.

In testimony whereof I have hereunto set my hand.

JOHN R. BARTHOLOMEW.